US011882503B1

(12) United States Patent
Xu

(10) Patent No.: US 11,882,503 B1
(45) Date of Patent: Jan. 23, 2024

(54) METHOD AND SYSTEM OF TWO-TIER LOCATION TRACKING

(71) Applicant: Anthony Xu, Allen, TX (US)

(72) Inventor: Anthony Xu, Allen, TX (US)

(*) Notice: Subject to any disclaimer, the term of this patent is extended or adjusted under 35 U.S.C. 154(b) by 0 days.

(21) Appl. No.: 18/298,061

(22) Filed: Apr. 10, 2023

Related U.S. Application Data

(60) Provisional application No. 63/378,082, filed on Oct. 2, 2022.

(51) Int. Cl.
*H04W 24/00* (2009.01)
*H04W 4/029* (2018.01)

(52) U.S. Cl.
CPC .................................. *H04W 4/029* (2018.02)

(58) Field of Classification Search
CPC ..................................................... H04W 4/029
See application file for complete search history.

(56) References Cited

U.S. PATENT DOCUMENTS

| 5,926,809 | A | 7/1999 | Szalwinski |
| 8,937,554 | B2 | 1/2015 | Kwan et al. |
| 10,008,097 | B1 | 6/2018 | Kumar et al. |
| 10,555,155 | B2 | 2/2020 | Taylor |
| 2009/0224909 | A1 | 9/2009 | Derrick et al. |
| 2014/0163867 | A1 | 6/2014 | Fernandez |

FOREIGN PATENT DOCUMENTS

| CN | 115081987 A | * | 9/2022 | |
| EP | 3506691 B1 | * | 5/2023 | ............ H04W 64/00 |

* cited by examiner

*Primary Examiner* — Erika A Washington

(57) ABSTRACT

A low-power tracking device transmitting periodic beacons for nearby hotspots using wide-area wireless network, such as LoRaWAN hotspots. The hotspots estimate the tracking device's coarse location, relying solely on the hotspots' received signal strength and hotspots' geolocation information, in order to reduce the tracking device's power consumption. When the tracking device is considered as lost, one or a plural of finder units are deployed within tracking device's vicinity to provide high precision location tracking. Using finder's instruction, the tracking device can reduce the beacon transmission intervals, transmit additional sensor information and perform other operations, to assist higher precision location tracking.

7 Claims, 13 Drawing Sheets

Tier 1 packet

| Word 0 | Sequence number |
|---|---|
| Word 1 | Sensor health information |

Tier 2 packet

| Word 0 | Sequence number |
|---|---|
| Word 1 | Motion sensor 1's data |
| Word 2 | Motion sensor 2's data |
| ⋮ | ⋮ |
| Word K | Motion sensor K's data |
| Word K+1 | Sensor health information |

METHOD AND SYSTEM OF TWO-TIER LOCATION TRACKING

FIELD OF THE INVENTION

The present invention relates generally to a method and system for tracking a device. More specifically, the present invention utilizes two tiers of location tracking to preserve battery life without sacrificing location accuracy and precision.

BACKGROUND OF THE INVENTION

Location tracking devices are commonly used for tracking children, senior citizens, pets, and objects. Within the industry many devices implement global positioning system (GPS) technology which are accurate and reliable but extremely energy intensive. GPS technology requires decoding signals from satellites thousands of miles away, and the decoding is usually performed within the device, requiring more energy. Furthermore, transmitting location data requires large amounts of energy and cellular service which creates an expensive and complex process. This results in location tracking devices that need to be charged quite often.

Further, other location tracking devices utilizes short range tracking, such as Bluetooth and ultra-wideband (UWB) technology. This technology allows a user to locate a device that is within a short range. Unfortunately, if the user does not get close to the device, the user will not be able to communicate with the device and receive the location. Furthermore, privacy concerns are raised when users need to agree to relay other user's information through their own personal mobile device to aid the location tracking.

BRIEF DESCRIPTION OF THE DRAWINGS

FIG. 9 is an illustrative example of the tracking device to LoRaWAN hotspot and finder unit communication packet format.

DETAIL DESCRIPTIONS OF THE INVENTION

All illustrations of the drawings are for the purpose of describing selected versions of the present invention and are not intended to limit the scope of the present invention.

Figure 1:
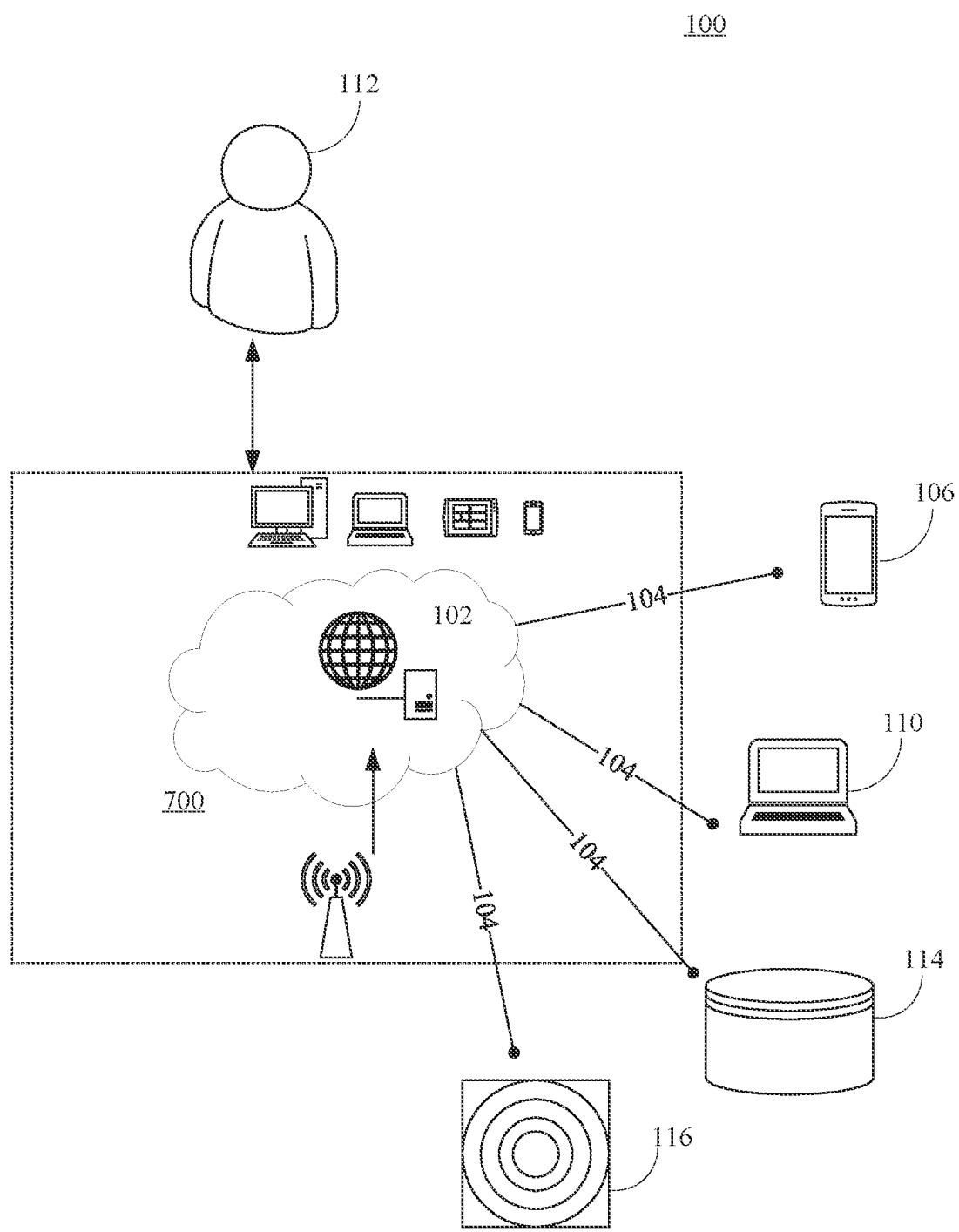
FIG. 1 is an illustration of an online platform consistent with various embodiments of the present disclosure.

FIG. 1 is an illustration of an online platform 100 consistent with various embodiments of the present disclosure. By way of non-limiting example, the online platform 100 enables two-tiered location tracking data and relevant data may be hosted on a centralized server 102, such as, for example, a cloud computing service. The location data and relevant data may include but are not limited to GPS location and timestamps. The centralized server 102 may communicate with other network 2 entities, such as, for example, a user terminal 1 (such as a smartphone, a laptop, a tablet computer, in-vehicle infotainment system, a standalone hardware unit, etc.), other electronic devices 110 (such as desktop computers, server computers etc.), databases 114, and sensors 116 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web-based software application or browser. The web-based software application may be embodied as, for example, but not be limited to, a website, a web application, a desktop application, and a mobile application compatible with a computing device 200.

Figure 2:
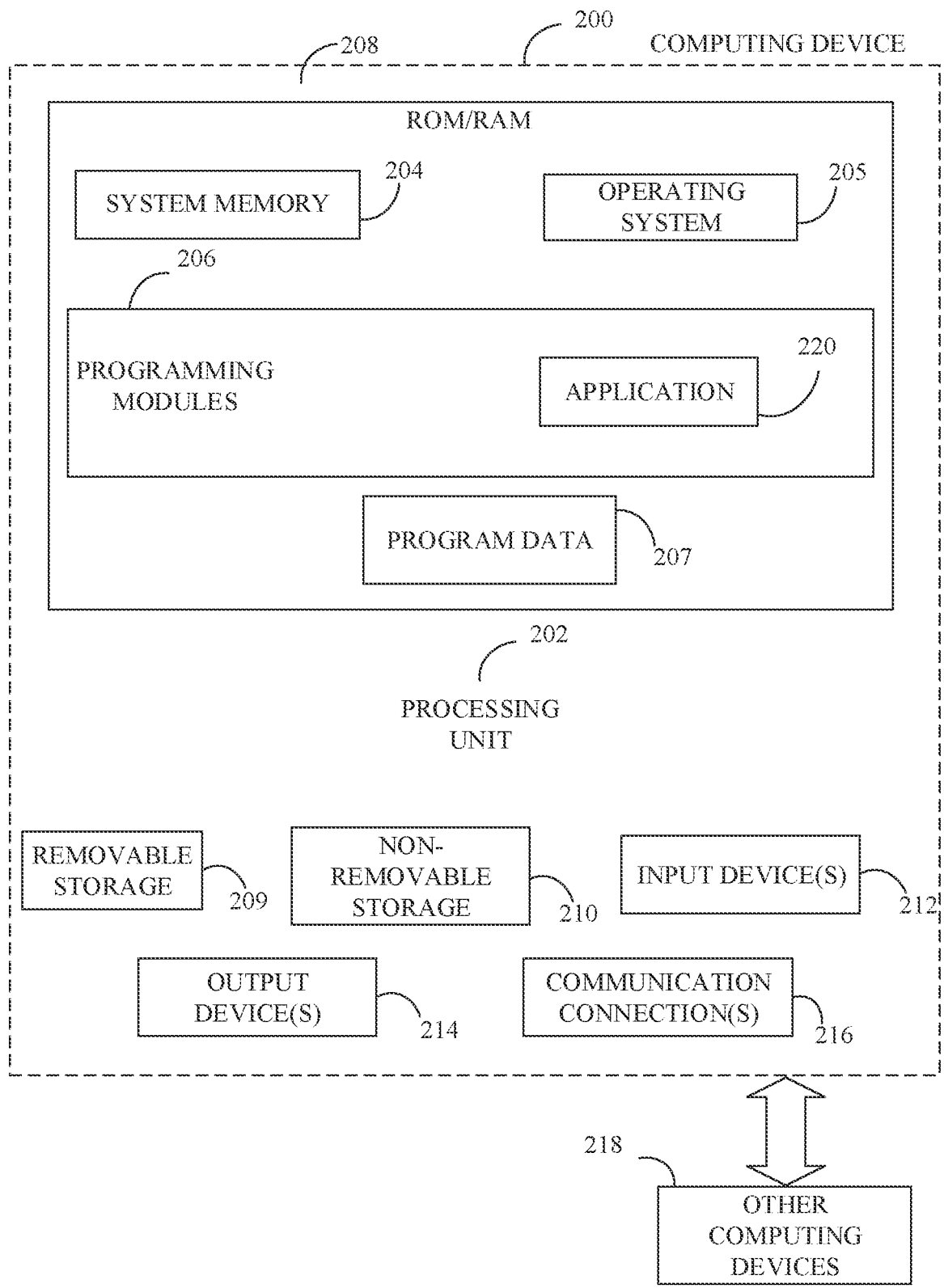
FIG. 2 is a block diagram of a computing device for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g., random-access memory (RAM)), non-volatile (e.g., read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing module, artificial intelligence and machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage mediums (removable and/or nonremovable) such as, for example, magnetic disks, optical disks, or tape. Such additional storage is illustrated in FIG. 2 by a removable storage 209 and a non-removable storage 210. Computer storage media may include volatile and non-volatile, removable and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network 2 in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network 2 or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning and artificial intelligence applications.

As can be seen in FIG. 1-13, the preferred embodiment of the present invention is a method and system for two-tier location tracking. In a normal situation when the general area of the tracking device 3 is needed, tier one is utilized and the accuracy requirements of the location of the tracking device 3 is reduced, and the present invention utilizes a low complexity implementation of the localization algorithm from the infrastructure side to sense the coarse location of the tracking device 3. In a situation where the user has lost the device and a precise location of the tracking device 3 is needed, tier two is utilized and the accuracy of the location of the tracking device 3 is increased. During tier two, one or a plurality of finder units 5 are deployed temporarily within the coarse location of the tracking device 3 and instruct the tracking device 3 to increase the transmitting power, to send higher frequency beacons and additional sensor information when needed.

Figure 3:
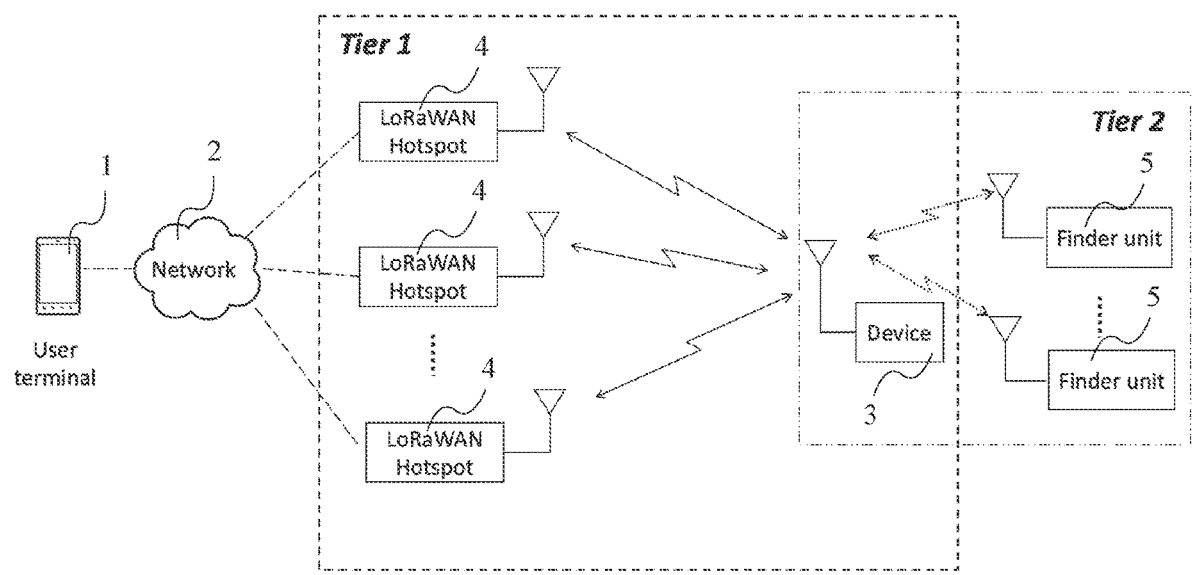
FIG. 3 is an illustration of the present invention system.

FIG. 3, illustrates a block diagram of a system for two-tier location tracking, in accordance with some embodiments. Accordingly, the system comprises a user terminal 1, a network 2, one or a plurality of LoRaWAN hotspots 4, a tracking device 3 and one or a plurality of finder units 5. LoRaWAN (Long Range Wide Area Network) is one embodiment of wide-area network (WAN). Without the loss of generality, LoRaWAN is used in this invention as the air-interface technology between hotspots and the tracking device, and between finder units and the tracking device. However, one can imagine that the invention is applicable to other WAN air interfaces. The plurality of LoRaWAN hotspots 4 is a low power networking protocol designed to wirelessly connect battery operated devices to the internet in various networks 2. The user terminal 1 may be portable electronic device capable of communicating with a remote network 2. The tracking device 3 comprises a tracking device processor 31, a tracking device memory 32, a tracking device ROM 33, a motion sensor 34, a power supply 35, and a tracking device LoRaWAN communication module 36, and a short-range wireless radio 37. The motion sensor 34 is an electronic device that measures external movements outside of the tracking device 3 such as an accelerometer, e-compass and gyroscope. The plurality of LoRaWAN hotspots 4 comprises a hotspot processor 41, a hotspot memory 42, a hotspot ROM 43, a hotspot LoRaWAN communication module 44, and a hotspot network port 45. The user terminal 1 connects remotely to the network 2. As a result, the user terminal 1 can send and receive information from the network 2 through a dedicated electronic device application. The network 2 connects remotely to the plurality of LoRaWAN hotspots 4. Consequently, the network 2 sends and receives messages from the plurality of LoRaWAN hotspots 4 to allow the user to read the information via a graphical user interface (GUI). The tracking device 3 connects remotely to the plurality of LoRaWAN hotspots 4 and the plurality of finder units 5 via LoRaWAN air interface. Accordingly, the tracking device 3 can communicate with the plurality of LoRaWAN hotspots 4 or the plurality of finder units 5 depending on the tracking tier being utilized.

Figure 4:
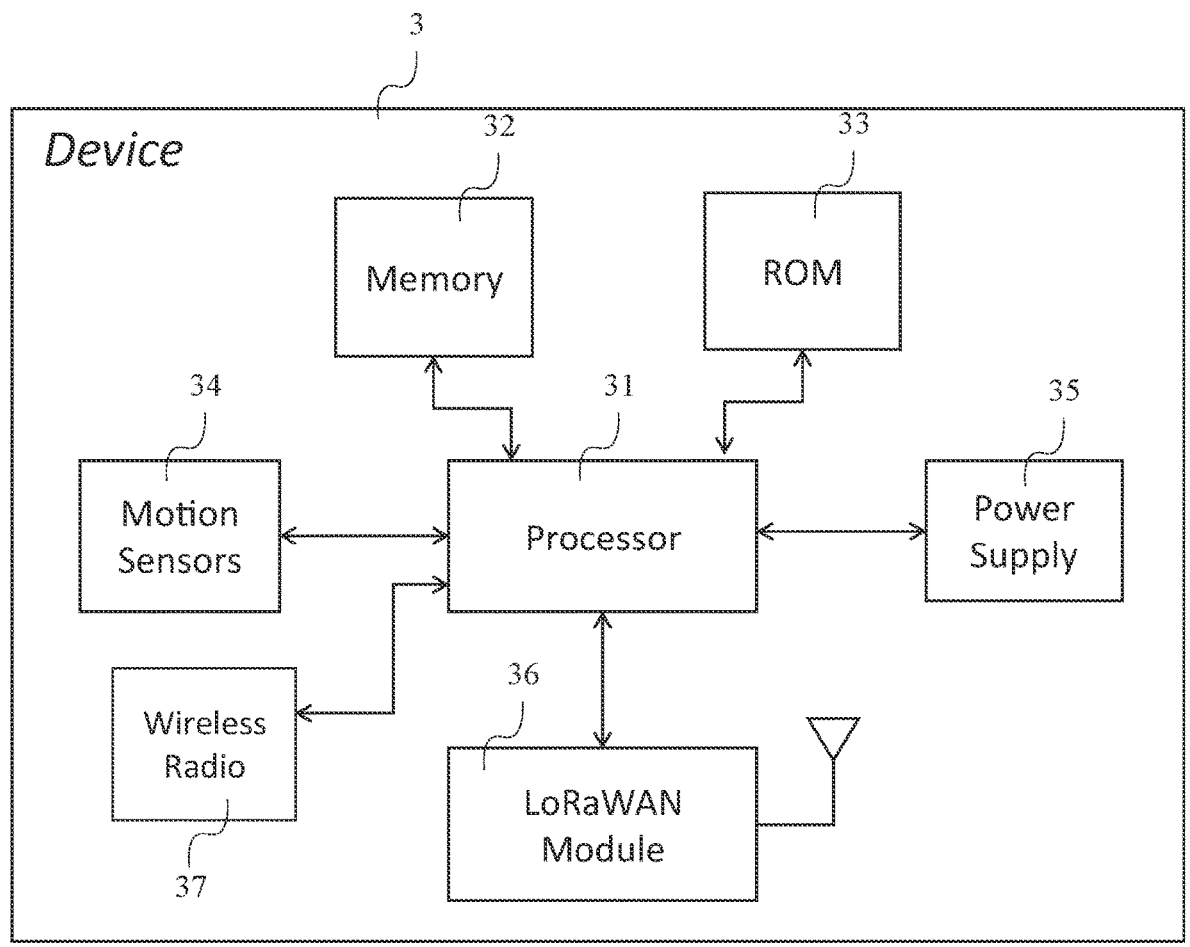
FIG. 4 is a block diagram of the location tracking device.

In reference to FIG. 4, the tracking device processor 31 is electronically connected to the tracking device memory 32, the tracking device ROM 33, the motion sensor 34, and the tracking device LoRaWAN communication module 36, and a short-range wireless radio 37. Thus, the tracking device processor 31 can obtain data and information from each of the attached devices to properly process and calculate information. The tracking device processor 31 is electrically connected to the power supply 35. So, the tracking device 3 receives electrical power to perform the necessary procuresses from the power supply 35 which is preferably a battery. The tracking device LoRaWAN communication module 36 connects remotely to the plurality of LoRaWAN hotspots 4 and the plurality of finder units 5.

Further, as shown in FIG. 4, the tracking device 3 further comprises a wireless radio 37. The wireless radio allows for external communication with electronic devices. For example, the wireless radio could be Bluetooth to enable communications with other electronic devices with Bluetooth capabilities. The wireless radio is electronically connected to the tracking device processor 31. As a result, the wireless radio can send information directly from the tracking device processor 31 to an external electronic device or more specifically the user terminal 1.

Figure 5:
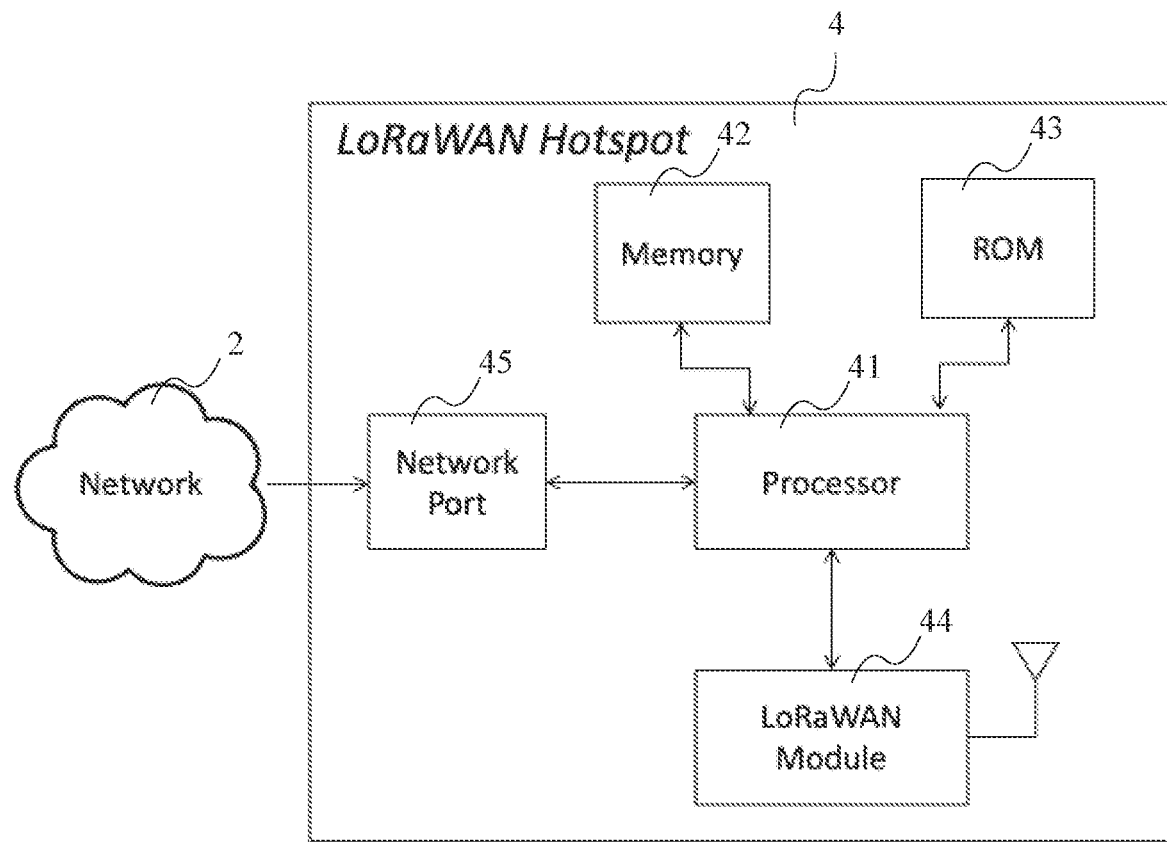
FIG. 5 is a block diagram of one of the plurality of LoRaWAN hotspots.

In reference to FIG. 5, the hotspot processor 41 is electronically connected to the hotspot memory 42, the hotspot ROM 43, the hotspot LoRaWAN communication module 44, and the hotspot network port 45. Accordingly, the hotspot processor 41 receives information and data from the connected components. The hotspot LoRaWAN communication module 44 connects remotely to the tracking device 3. Thus, the hotspot LoRaWAN communication module 44 communicates with the tracking device 3 to receive and send a beacon. The hotspot network port 45 is a physical Ethernet port. So, the hotspot network port 45 allows the plurality of LoRaWAN hotspots 4 to receive a physical cable to connect to the Internet. In an alternative embodiment the hotspot network port 45 is a wireless Wi-Fi port. As a result, the Wi-Fi technology is utilized to connect the plurality of LoRaWAN hotspots 4 to the Internet.

Figure 7:
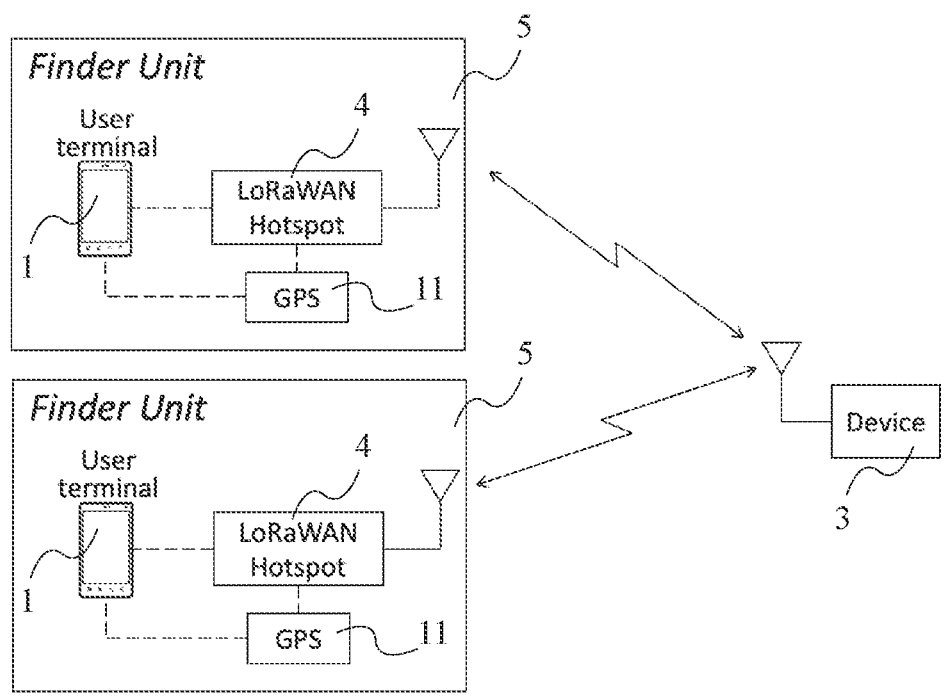
FIG. 7 is an illustration of the tracking device communicating with plurality of finder units.

In reference to FIG. 7, the plurality of finder units 5 each comprises the user terminal 1, a LoRaWAN hotspot unit 4, and a GPS device 11. Consequently, the user terminal 1 connects to a dedicated LoRaWAN hotspot through the network 2 or serial connection. The LoRaWAN hotspot unit 4 connects directly to a GPS device 11. Accordingly, the LoRaWAN hotspot 4 being used by the finder unit is portable and can obtain its precise location through the GPS device 11. Furthermore, the GPS device 11 can provide timing information to the LoRaWAN hotspot 4 so that the precise timing information is obtained by the LoRaWAN hotspot 4 and the tracking device 3. The timing information is utilized to create a higher location precision by utilizing a time of arrival (TOA) or a time-difference of arrival (TDOA) algorithm.

As can be seen in FIG. 3, the system used to execute the method of the present invention allows the present invention to function to track a device with two tiers. To accomplish this, the method of the present invention transmits beacons at certain intervals to one or a plurality of LoRaWAN hotspots 4. The tracking device 3 sends out beacons with information while in a tier one mode. The system used to execute the method of the present invention estimates the location of the tracking device 3 based on the received signal strength of the beacons. During this tier one mode the beacons are sent every few minutes or even longer to reduce power consumption. For example, if the tracking device 3 is far away from the user and the user does not need to know the high precision location, beacons are sent from the tracking device 3 every few minutes or even longer to update the user on the general vicinity of the tracking device 3. The update interval can be configured using the user terminal 1.

Figure 6:
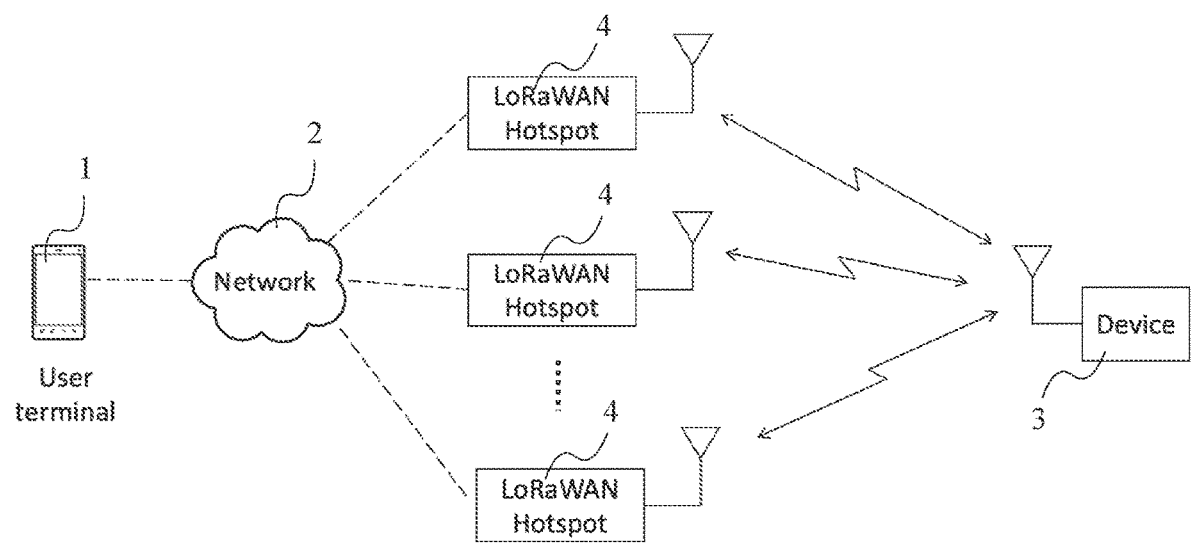
FIG. 6 is an illustration of the tracking device communicating with plurality of LoRaWAN hotspots.

As can be seen in FIG. 6, the system used to execute the method of the present invention allows the present invention to utilize the location of one or the plurality of LoRaWAN hotspots 4 to calculate the position of the tracking device 3. To accomplish this, the method of the present invention estimates the location of the tracking device 3 based on the geolocation of one or the plurality of LoRaWAN hotspots 4.

In tier two mode, the system used to execute the method of the present invention deploys one or a plurality of finder units 5 to the vicinity of the tier one estimated location of the tracking device 3. For example, if the user has obtained the coarse location of the tracking device 3 and needs to find the precise location of the tracking device 3, the user can move to the coarse location of the tracking device 3 with one or a plurality finder units.

As can be seen in FIG. 7, the system used to execute the method of the present invention allows the present invention to find the precise location of the tracking device 3. To accomplish this, the method of the present invention reduces the beacon transmission intervals and increases transmission power. This allows the finder unit to receive real time information important to the tracking device 3 location. The system used to execute the method of the present invention transmits additional sensor information. The additional sensor information is useful for calculations in various algorithms to determine the tracking device 3 location.

The path loss model is used for these algorithms. The ratio of received to transmitted power is given by:

$$\frac{P_r}{P_t} = \left(\frac{\sqrt{G}\lambda}{4\pi d}\right)^\gamma \quad (1)$$

where $P_r$ and $P_t$ are received and transmitted power, respectively, G is the path gain, $\lambda$ is the wavelength of the signal, d is the distance from receiver to transmitter, and $\gamma$ is the path loss exponent, which equals 2 in free space but increases as the environment has more obstacles. As one can see, in this model, given a certain LoRaWAN air interface, $P_r$ is inversely proportional to d to the power $\gamma$. Received power $P_r$ is recorded by LoRaWAN hotspot 4 for the beacon sent by the tracking device 3. By using this information, we can estimate the distance between hotspot 4 and the tracking device 3.

One example least-square algorithm can be used to determine the distances from the point of the tracking device 3 to known locations of the plurality of LoRaWAN hotspots 4.

We can solve d in the equation (1) yields:

$$\hat{d} = \frac{\sqrt{G}c}{4\pi f\left(10^{(R-T)/(10\gamma)}\right)}, \quad (2)$$

where $\hat{d}$ represents the predicted value of d. All variables on the right-hand side of the equation are known except for $\gamma$, for which the median value of $\gamma$ across all data collected was used. R and T are the received power and transmitted power in linear term.

The distances are then used to calculate the most likely location of the tracking device 3. A least-square approach to calculating position based on the distances to several hotspots 4.

First, we must map to an equirectangular projection: $\phi$ if is the latitude of a point, $\lambda$ is the longitude of a point, r is the radius of the Earth, and $\phi_0$ is a reference latitude close to the center of the map (for which we will use the mean of the latitudes of the plurality of LoRaWAN hotspots 4), then the equirectangular projection gives:

$x=r\lambda \cos \phi_0$ $y=r\phi \quad (3)$

With the distances obtained and the most likely point of the location tracking device 3 calculated the latitude-longitude coordinates are mapped into simple x-y coordinates on a two-dimensional plane. If we have K hotspots, the least-square solution is given by equation (3):

$$x = \frac{1}{2}(A^T A)^{-1} A^T h, \quad (4)$$

$$x = \begin{bmatrix} x \\ y \end{bmatrix}$$

$$A = \begin{bmatrix} x_2 - x_1 & y_2 - y_1 \\ \cdots & \cdots \\ x_K - x_1 & y_K - y_1 \end{bmatrix}$$

$$h = \begin{bmatrix} x_2^2 - x_1^2 + y_2^2 - y_1^2 + \hat{d}_1^2 - \hat{d}_2^2 \\ \cdots \\ x_K^2 - x_1^2 + y_K^2 - y_1^2 + \hat{d}_1^2 - \hat{d}_K^2 \end{bmatrix}.$$

For a LoRaWAN hotspot 4 numbered k, $x_k$ and $y_k$ represent the position of the LoRaWAN hotspot 4 according to the equirectangular projection, and $d^k$ represents the distance from the LoRaWAN hotspot 4 to the tracking device 3.

Another algorithm by which this problem can be solved is using a maximum likelihood estimate. This method assumes that the path loss exponent $\gamma$ is normally distributed. For each possible point, we calculate the distance from that point to the plurality of LoRaWAN hotspots 4. Then, from this distance and the other known values, we can calculate the corresponding value of γ from a rearrangement of (4) which gives equation (5) below:

$$\gamma = \frac{R-T}{10\log\left(\frac{\sqrt{G}c}{4\pi fd}\right)} \quad (5)$$

Since γ is normally distributed, we can calculate a relative probability that the computed path loss exponent is correct. This relative probability is given by $N(\mu_\gamma, \sigma_\gamma, \gamma_c)$, where $\mu_\gamma$ and $\sigma_\gamma$ represent the mean and standard deviation of the path loss exponent, $\gamma_c$ is the computed path loss exponent, and $N(x,y,z)$ is our notation for the value of a Gaussian probability density function. with mean x and standard deviation y at z. To account for multiple hotspots, we simply multiply the probabilities together and take the point with maximum probability. Thus, the maximum likelihood estimate P is given by equation (6):

$$P = \mathrm{argmax}_{P'} \prod_{H \in hotspots} \mathcal{N}(\mu_\gamma, \sigma_\gamma, f(H, P')), \quad (6)$$

where f is a function that takes a hotspot reading H and a point P and outputs the computed path loss exponent $\gamma_c$. The advantage of using the maximum likelihood estimate method is that it is more accurate than the least-square method, since it also factors in the standard deviation of the path loss exponent.

In reference to FIG. 3, a sub-process of the method of the present invention enables the tracking device 3 to communicate with surrounding devices. To that end, the sub-process begins with the tracking device 3 sending beacons to the plurality of LoRaWAN hotspots 4. The beacons are received by hotspot 4, and the received signal strength can be utilized to calculate a coarse location using the algorithms described above. The sub-process continues by processing the beacons with the tracking device processor 31. The tracking device 3 is also designed to receive beacons which are then analyzed and processed by the tracking device processor 31 to parse through the information received. The sub-process continues by integrating external sensors to the tracking device processor 31. This allows the tracking device 3 to utilize information about the surrounding area and movement of the tracking device 3 to aid in calculating the location of the tracking device 3. For example, if an accelerometer is equipped to the tracking device 3, this movement information can be utilized when triangulating the position based on the plurality of LoRaWAN hotspots 4.

In reference to FIG. 5, a sub-process of the method of the present invention enables the plurality of LoRaWAN hotspots 4 to communicate with surrounding devices. To that end, the sub-process begins by the plurality of LoRaWAN hotspots 4 receiving beacons from the tracking device 3. The plurality of LoRaWAN hotspots 4 obtain various information useful in calculating the coarse location of the tracking device 3.

The sub-process continues by the hotspot LoRaWAN communication module 44 sending the beacon information to the hotspot processor 41. The hotspot processor 41 is designed to decode and understand the beacon information being sent from the tracking device 3. The sub-process continues by processing the beacon information into a communication message. The beacon information is then transferred into a communication message that can be read and understood in plain language on a GUI. The sub-process continues by delivering the communication messages to a network 2. The communication message is then sent to a network 2 which is a remote server to retain and store the information. For example, once the tracking device 3 sends out a beacon it is received by a plurality of LoRaWAN hotspots 4 where the beacon information is then processed into a communication message that is stored on a remote server that can be accessed by an authorized device.

In reference to FIG. 6, a sub-process of the method of the present invention enables the coarse location of the tracking device 3 to be calculated. To that end, the sub-process begins by processing the communication messages in the network 2. This allows the information to be parsed through to be used for location calculations. The sub-process continues by the user terminal 1 receiving the location information from at least one LoRoWAN hotspot. By way of the network 2 the location information is sent from a LoRaWAN hotspot to the user terminal 1 running the mobile application. The sub-process continues by calculating the device location based on the location information from at least one LoRoWAN hotspot. With the information obtained from the plurality of LoRaWAN hotspots 4, calculations with an algorithm are completed to estimate the coarse location of the tracking device 3. For example, after a beacon is received and processed by the plurality of LoRaWAN hotspots 4 the information is sent through the network 2 to a user terminal 1 that is connected to the network 2, where the information is processed and shown to the user through a GUI to allow the user to visualize the tracking device 3 coarse location.

In reference to FIG. 7, a sub-process of the method of the present invention enables precise location tracking in tier two. To that end, the sub-process begins by the user terminal 1 displaying a graphical user interface. The GUI provides a visual representation of the tracking device 3 coarse location. The sub-process continues by the user terminal 1 connecting to one of the plurality of portable finder units 5 which contains LoRaWAN hotspot unit 4 through the network 2. This allows the user terminal 1 to receive various communication messages containing location information. The sub-process continues by obtaining the LoRaWAN hotspot location with a GPS device 11. With the GPS device 11 the LoRaWAN geolocations are obtained which is useful when performing some calculations about the precise location.

In reference to FIG. 9, a sub-process of the method of the present invention enables precise location tracking in tier two. To that end, the sub-process begins by providing timing information to the LoRaWAN hotspot. This information is useful for completing TOA and TDOA algorithm calculations. The sub-process continues by increasing the tracking device 3 location precision. The tracking device 3 location precision is increased when activating a tier two mode for location tracking. The sub-process continues by deploying a plurality of finder units 5. The plurality of finder units 5 is positioned within the vicinity of the tracking device 3 and aid in creating a precise and accurate location calculation. Being in vicinity of tracking device 3 allows finder units 5 to receive stronger signals and more frequently. Multiple finder units 5 also provide geographic diversity and measurement points. With reasonable signal processing knowledge, one can expect the location estimation algorithm, as shown in equation (6), can achieve higher accuracy under this condition. The sub-process continues by accelerating the tracking device 3 search process. The sub-process continues by improving the tracking device 3 location accuracy. The more finder units 5 deployed the quicker and more accurate the calculations become.

In reference to FIG. 9, a sub-process of the method of the present invention enables a tier one tracking location mode. To that end, the sub-process begins by establishing a monitoring mode. The monitoring mode is a tier one tracking location mode that saves battery life of the tracking device 3 when interacting with the plurality of LoRaWAN hotspots 4. The sub-process continues transmitting beacons with long time intervals. A beacon is sent from the tracking device 3 during this tier one tracking location mode every few minutes or even longer to ensure the tracking device 3 does not waste power sending out beacons more often than needed for the current circumstance. The update interval can be configured using terminal 1 as an example. Returning again to the example, if the user only wants to know the coarse location of where the tracking device 3 is, they can stay within the tier one location tracking mode to save power and increase the battery life of the tracking device 3.

Figure 8:
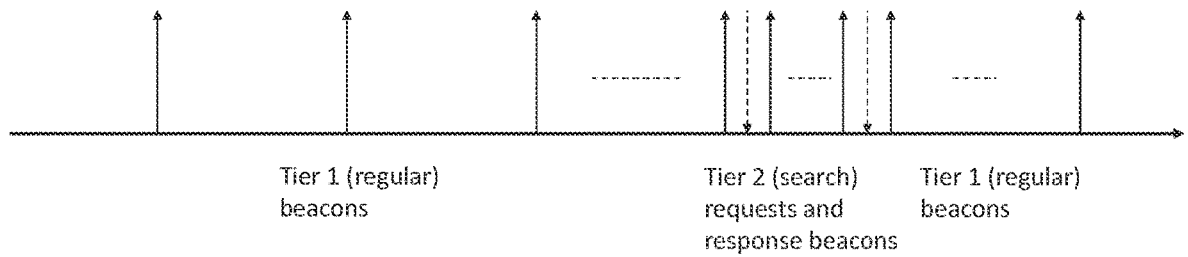
FIG. 8 is an illustrative example of the tier one and tier two localization scheme.
Figure 10:
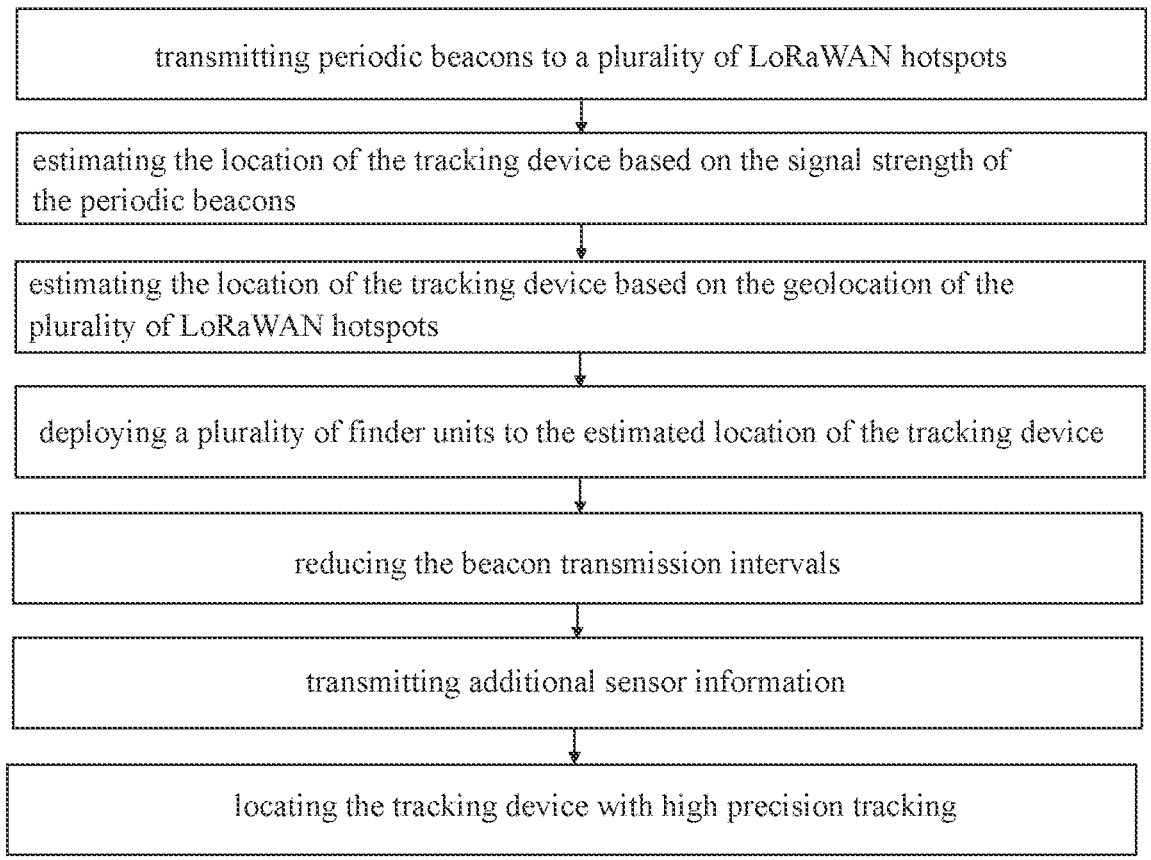
FIG. 10 is a flowchart of the present invention method.

In reference to FIG. 8, a sub-process of the method of the present invention enables the tier two location tracking mode to be activated. To that end, the sub-process begins by establishing a lost mode. The lost mode is the tier two location tracking mode where a precise location is needed for the tracking device 3. The sub-process continues by deploying at least one finder unit near the tracking device 3. Based on the coarse location of the tracking device 3 obtained previously in tier one, at least one finder unit can be placed near the tracking device 3.

The sub-process continues by sending a search beacon to the tracking device 3. The search beacon contains information that is processed by the tracking device 3 to active the lost mode on the tracking device 3. To that end, the sub-process continues by receiving beacons with short time intervals from the tracking device 3. The short time intervals allow for real time information to be received by at least one finder unit. The sub-process continues by sending the search beacon to the tracking device 3. This is performed once the tracking device 3 is located with a precise location and the tracking device 3 can return back to the tier one location tracking mode to preserve battery life. The sub-process continues returning to the monitoring mode.

Figure 11:
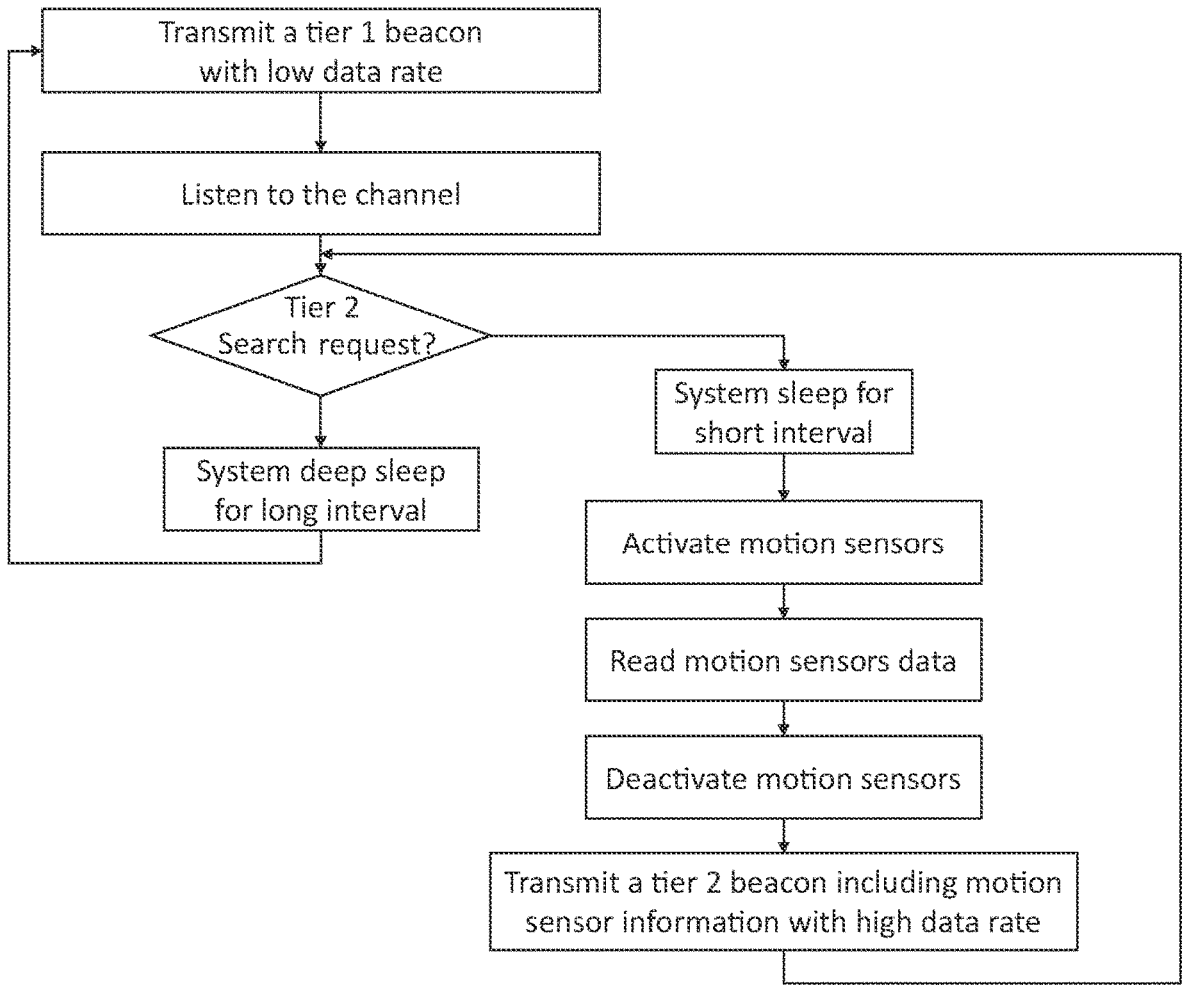
FIG. 11 is a flowchart of the tracking device operations.

In reference to FIG. 11, a sub-process of the method of the present invention enables the tracking device 3 to operate with a tier one and tier two location tracking mode. To that end, the sub-process begins by transmitting beacon with low data rate. During the tier one tracking mode the beacon sent from the tracking device 3 is of a low data rate with minimal information to reduce power consumption. The sub-process continues by listening to channel of sent beacon. The tracking device 3 monitors the channel of the beacon sent with a low data rate to listen for any incoming beacons. The sub-process continues by checking for a search request beacon. The tracking device 3 is specifically looking for a search request beacon which will change the tracking device 3 from tier one to tier two location tracking. The sub-process continues by placing the tracking device 3 into a conservation mode when no search beacon is received. When the channel is properly monitored and no search beacon is received from a plurality of finder units 5 then the tracking device 3 stays within tier one location tracking and sends beacons out at long intervals to conserve power.

In reference to FIG. 11, a sub-process of the method of the present invention enables the tier two location tracking mode to be activated. To that end, the sub-process begins by receiving a search beacon. The tier two location tracking mode is activated when a search beacon is obtained by the tracking device 3. The sub-process continues by placing the tracking device 3 into a short conservation mode. This ensures beacons are sent out by the tracking device 3 more frequently with tracking device 3 on standby during intervals. The sub-process continues by activating motion sensor 34. The motion sensor 34 gathers external information and data about the surroundings of the tracking device 3 or how the tracking device 3 is moving. To that end, the sub-process continues by reading motion sensor 34 data. The information and data gathered by the motion sensor 34 is then analyzed by the tracking device 3. The sub-process continues by deactivating motion sensor 34 data. After obtaining the information and data the motion sensor 34 is turned off to conserve battery life of the tracking device 3. The sub-process continues by transmitting a beacon with a high data rate. The beacon sent from the tracking device 3 then contains the sequence number, tracking device 3 battery level, and the motion sensor 34 data obtained.

Figure 12:
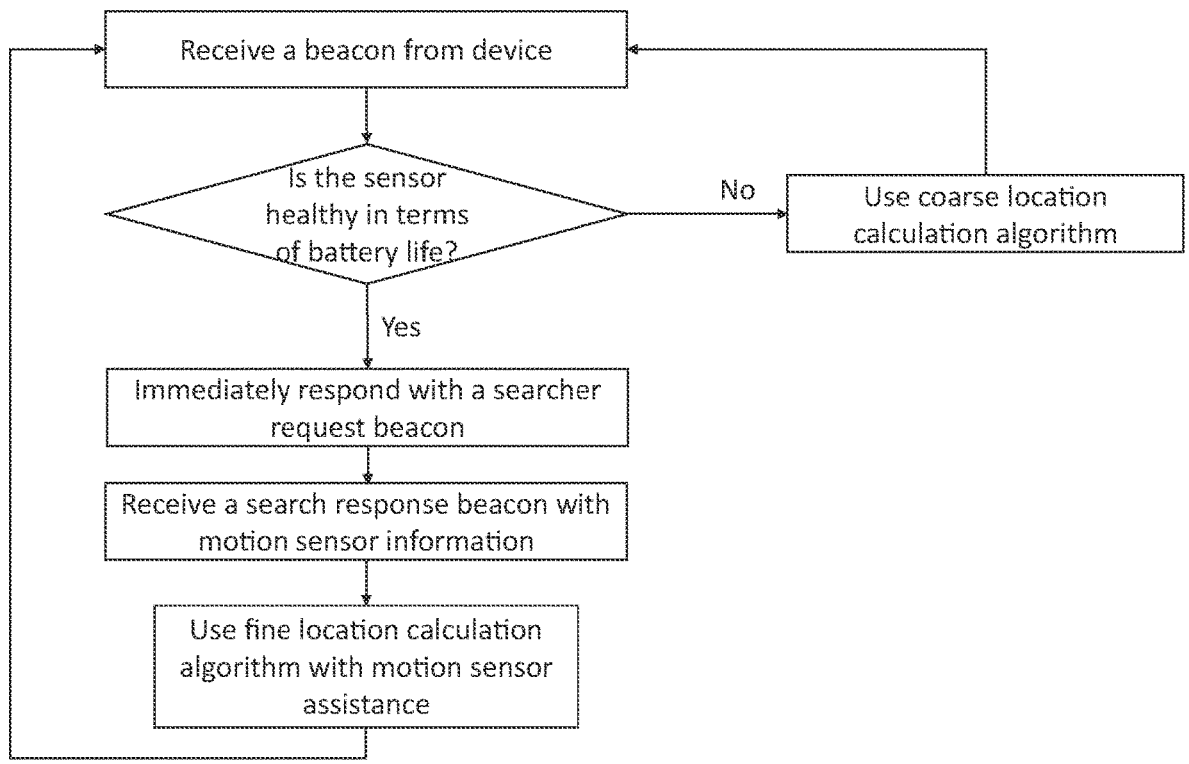
FIG. 12 is a flowchart of the plurality of tracking units' operations.

In reference to FIG. 12, a sub-process of the method of the present invention enables the tracking device 3 battery level to be monitored. To that end, the sub-process begins by receiving a beacon from the tracking device 3. The beacon contains both the sequence number and tracking device 3 battery level information. The sub-process continues by checking the battery life of the tracking device 3. Based on the tracking device 3 battery level information received the tracking device 3 will perform differently. The sub-process continues by calculating coarse location of tracking device 3 if battery life of the tracking device 3 is low. Returning again to the example, if the battery life of the tracking device 3 is low and the beacon received indicates as such, only the coarse location of the tracking device 3 is determined in order to ensure the tracking device 3 does not lose power completely.

Figure 13:
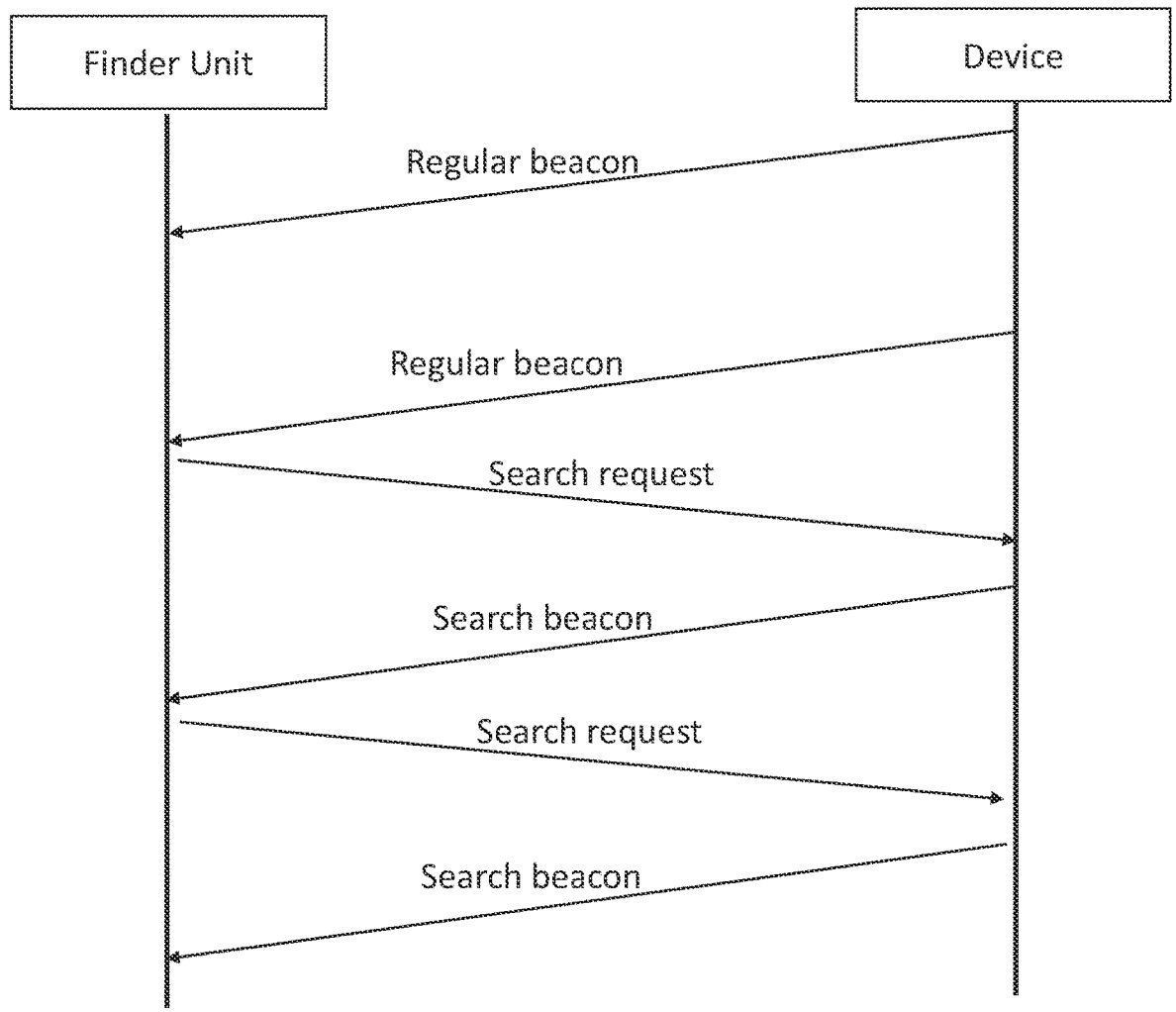
FIG. 13 is an illustration of messages exchanged between the finder and the tracking device.

In reference to FIG. 13, a sub-process of the method of the present invention enables a precise location to be determined if the battery level of the tracking device 3 is not low. To that end, the sub-process begins by sending a search beacon if the tracking device 3 battery life is not low. The search beacon is sent from the plurality of tracking device 3 to turn the tier two location tracking mode on in the tracking device 3. The sub-process continues by receiving a search beacon. Once the tracking device 3 receives a search beacon the tier two location tracking is activated. The sub-process continues by calculating precise location of tracking device 3. At this point the tracking device 3 then sends beacons containing more information to obtain the precise and accurate location of the tracking device 3.

Although the invention has been explained in relation to its preferred embodiment, it is to be understood that many other possible modifications and variations can be made without departing from the spirit and scope of the invention as hereinafter claimed.

What is claimed is:
1. A two-tier location tracking system comprising:
a user terminal;
a network;
a plurality of long-range wide area network (LoRaWAN) hotspots;
a tracking device;
a plurality of finder units;
the tracking device comprising a tracking device processor, a tracking device memory, a tracking device ROM, a motion sensor, a power supply, and a tracking device LoRaWAN communication module;

each of the plurality of LoRaWAN hotspots comprising a hotspot processor, a hotspot memory, a hotspot ROM, a hotspot LoRaWAN communication module, and a hotspot network port;

the user terminal connecting remotely to the network;

the network connecting remotely to the plurality of LoRaWAN hotspots; and the tracking device connecting remotely to the plurality of LoRaWAN hotspots and the plurality of finder units;

tier one of the two-tier location tracking system comprising the tracking device connecting remotely to the plurality of LoRaWAN hotspots at fixed locations to determine the first tier (coarse) location of the tracking device;

tier two of the two-tier location tracking system comprising the tracking device connecting remotely to the plurality of finder units deployed by users with known locations of which, to determine the second tier (refined) location of the tracking device.

2. The two-tier location tracking system as claimed in claim 1 comprising:

the tracking device processor being electronically connected to the tracking device memory, the tracking device ROM, the motion sensor, and the tracking device LoRaWAN communication module;

the tracking device processor being electrically connected to the power supply; and the tracking device LoRaWAN communication module connecting remotely to the plurality of LoRaWAN hotspots at fixed locations, which enables tier one of the two-tier location tracking system.

3. The two-tier location tracking system as claimed in claim 2 comprising:

the tracking device further comprising a wireless radio;

the wireless radio being electronically connected to the tracking device processor; and the hotspot network port connecting electronically to the network.

4. The two-tier location tracking system as claimed in claim 1 comprising:

the hotspot processor being electronically connected to the hotspot memory, the hotspot ROM, the hotspot LoRaWAN communication module, and the hotspot network port; and the hotspot LoRaWAN connecting remotely to the tracking device.

5. The two-tier location tracking system as claimed in claim 4 comprising the network port being a physical Ethernet port.

6. The two-tier location tracking system as claimed in claim 4 comprising the network port being a wireless Wi-Fi port.

7. The two-tier location tracking system as claimed in claim 1 comprising:

the plurality of finder units, whose locations are known; and the tracking device LoRaWAN communication module connecting remotely to the plurality of finder units, which enables tier two of the two-tier location tracking system.

* * * * *